(12) United States Patent
Matsumura et al.

(10) Patent No.: US 8,232,774 B2
(45) Date of Patent: *Jul. 31, 2012

(54) BATTERY CHARGE MANAGEMENT USING A SCHEDULING APPLICATION

(75) Inventors: Naoki Matsumura, Tokyo (JP); Nobuhiro Otani, Chiba-ken (JP); Don J. Nguyen, Portland, OR (US); Kiyohiro Hamaji, Ibaraki-ken (JP)

(73) Assignee: Intel Corporation, Santa Clara, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 12/967,209

(22) Filed: Dec. 14, 2010

(65) Prior Publication Data

US 2011/0080141 A1     Apr. 7, 2011

Related U.S. Application Data

(63) Continuation of application No. 11/765,622, filed on Jun. 20, 2007, now Pat. No. 7,852,045.

(51) Int. Cl.
*H02J 7/00*   (2006.01)
*H02J 7/16*   (2006.01)
*G01N 27/416*   (2006.01)
*G08B 21/00*   (2006.01)

(52) U.S. Cl. ........ 320/134; 320/149; 320/155; 324/426; 340/636.1; 340/636.21

(58) Field of Classification Search .............. 320/134
See application file for complete search history.

(56) References Cited

U.S. PATENT DOCUMENTS

| 6,772,366 | B2* | 8/2004 | Nguyen et al. ............... 714/10 |
| 7,852,045 | B2 | 12/2010 | Matsumura et al. |
| 2001/0005126 | A1* | 6/2001 | Ichihara et al. ............ 320/149 |
| 2002/0060554 | A1* | 5/2002 | Odaohhara et al. ......... 320/134 |
| 2003/0076072 | A1* | 4/2003 | Tojo et al. .................. 320/134 |
| 2008/0315836 | A1 | 12/2008 | Matsumura et al. |

* cited by examiner

*Primary Examiner* — Yalkew Fantu
(74) *Attorney, Agent, or Firm* — Kacvinsky Saisak PLLC

(57) ABSTRACT

According to some embodiments, battery charge management using a scheduling application is disclosed. A first parameter may be received from a scheduling application running on a mobile computing device having a battery pack. Based on at least the first parameter and battery pack data, a required charge percentage for the battery pack may be determined and the remaining capacity of the battery pack may be determined. If the remaining capacity of the battery pack is less than the required charge percentage, a charge termination voltage may be determined and the battery pack may be charged to the charge termination voltage.

14 Claims, 3 Drawing Sheets

BATTERY CHARGE MANAGEMENT USING A SCHEDULING APPLICATION

BACKGROUND

Typically, the battery pack of a mobile device such as a notebook computer will be charged to 100% capacity when an AC (alternating current) adapter is connected to the mobile device. The battery pack is discharged when the AC adapter is disconnected from the mobile device and the mobile device is operating on battery power. Battery capacity gradually decreases as a mobile device is used. For example, at 500 battery charge cycles, the battery capacity may decrease to approximately 60% of its initial capacity. Furthermore, the battery capacity may diminish if the battery is never discharged because the battery can degrade at high voltages.

BRIEF DESCRIPTION OF THE DRAWINGS

A better understanding of embodiments of the present invention can be obtained from the following detailed description in conjunction with the following drawings, in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

Figure 1:
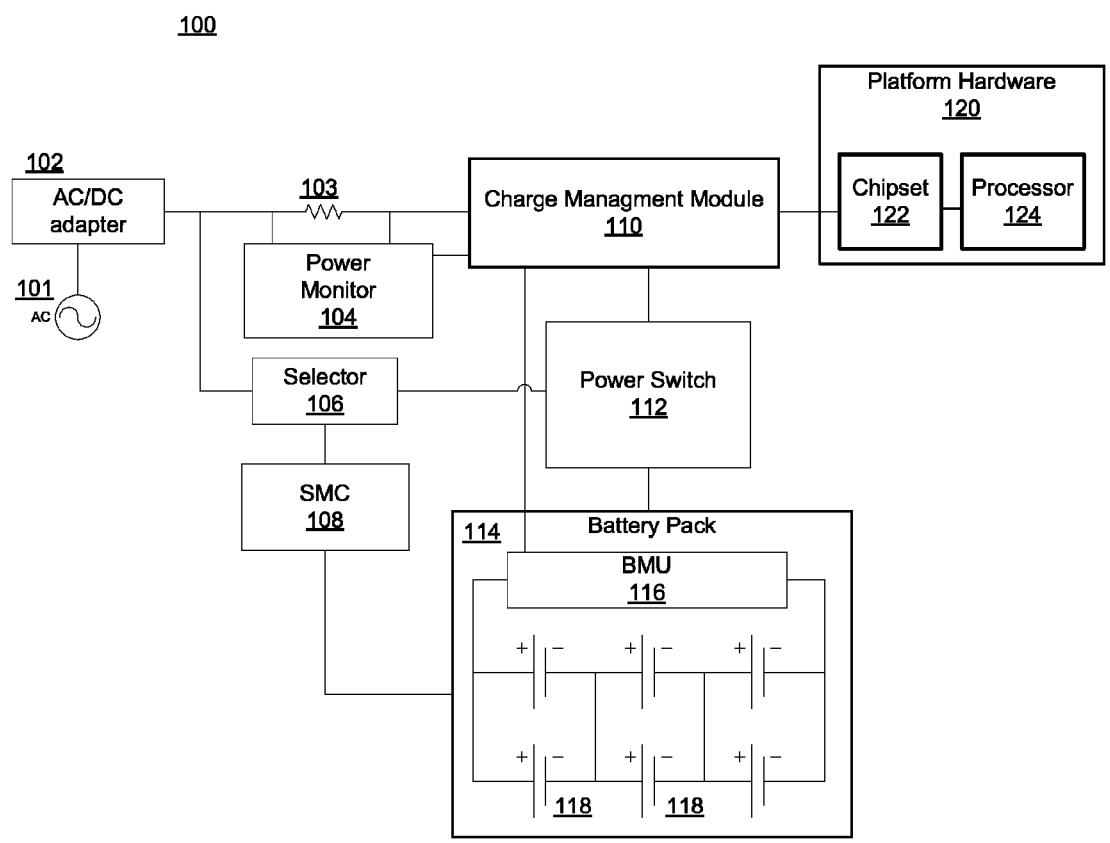
FIG. 1 is a block diagram of a system according to some embodiments.

FIG. 1 is a block diagram of a system according to some embodiments. The system may include platform hardware 120, which may include one or more of a processor 124, a chipset 122, and/or other components that are not illustrated for clarity, such as volatile or non-volatile memory, a network interface, and input/output devices.

The platform hardware 120, including one or more of chipset 122 and/or processor 124, may be coupled to a charge management module 110. The charge management module 110 may be further coupled to an AC/DC (alternating current/ direct current) adapter 102, a power monitor 104, a power switch 112, and a battery pack 114. The power monitor 104 may sense current from the AC/DC adapter 102 by measuring the voltage across resistor 103. The power switch 112 may be used to switch the flow of current from one battery pack 114 to another during charge and discharge if multiple battery packs 114 are being used. The system management controller (SMC) 108 may be coupled to the battery pack 114 to receive battery pack information. SMC 108 may also be coupled to a selector 106, and may indicate to the selector 106 which battery pack 114 should be charged and/or used if multiple battery packs 114 are attached.

The charge management module 110 may include hardware and/or software to switch between an AC/DC adapter 102 providing power from an AC power source 101 and battery power from a battery pack 114. Battery pack 114 may include a battery management unit 116 and one or more battery cells 118.

In some embodiments, the charge management module 110 may monitor portions of the system to determine when to switch to AC power to charge the battery pack 114 and/or when to switch to battery power to draw down the charge of the battery pack 114. The charge management module 110 may monitor one or more characteristics of the battery pack 114 via the battery management unit (BMU) 116, including but not limited to battery pack capacity, pack voltage, voltage for each battery cell 118, cycle count, temperature, and current through the BMU. The charge management module 110 may also monitor a user's schedule or calendar via a scheduling application running on processor 124.

Based on the user's schedule and the battery characteristics, the charge management module 110 may determine the percentage of battery charge that is required for the next time period when the user will not have AC power available from an AC power source (e.g., when the user is scheduled to be in a meeting). The charge management module 110 may then determine the charge termination voltage required to meet the required battery charge percentage. The charge management module 110 may also estimate how long it will take the battery to charge to the desired charge termination voltage. If the length of time to charge the battery to the desired voltage is greater than the time the user will have AC power available, the charge management module 110 may notify the user, for example via the scheduling application or another notification mechanism. If the length of time to charge the battery is less than the time the user will have AC power available, the charge management module 110 may switch to AC power if battery power is presently being used, and may charge the battery to the desired charge termination voltage. If the battery voltage is greater than the desired charge termination voltage, the charge management module 110 may switch from AC power to battery power to discharge the battery to the appropriate voltage.

Figure 2:
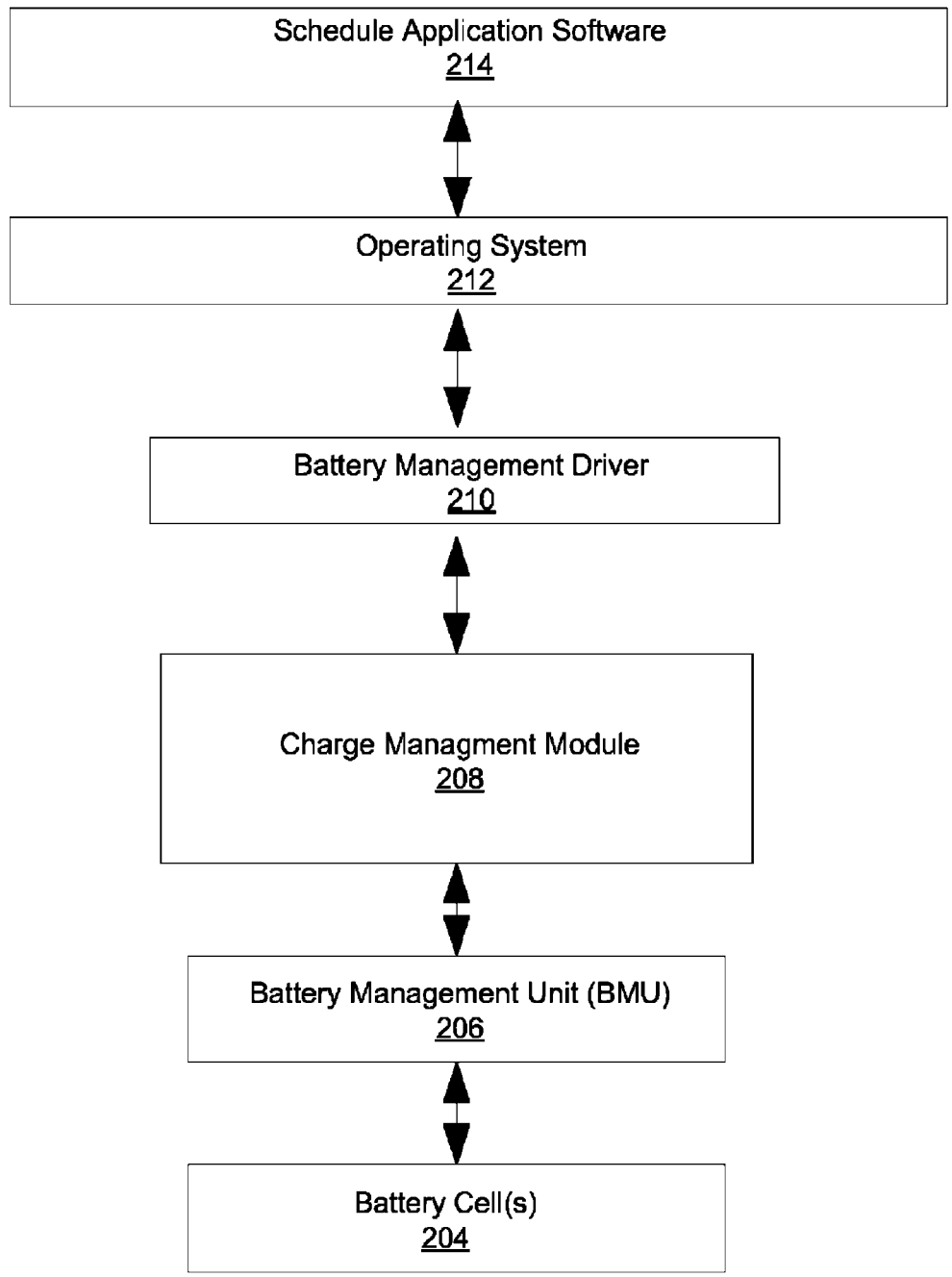
FIG. 2 is a diagram illustrating how a charge management module interacts with components within a mobile computing device according to some embodiments.

FIG. 2 is a diagram illustrating how a charge management module interacts with components within a mobile computing system according to some embodiments. The charge management module 208 may receive information from both system hardware and system software.

The battery management unit 206 may monitor the battery cells 204 within a battery of a mobile computing device. The battery management unit 206 may provide the charge management module 208 with battery pack data. The battery pack data may include one or more of battery pack capacity, battery voltage, cell voltage for each cell, cycle count, temperature, and current.

The battery management driver 210 may monitor a schedule application 214 running on an operating system 212. The battery management driver 210 may provide the charge management module 208 with information about a user's schedule. For example, if a user's calendar in schedule application 214 includes a meeting, an out of office notice, or a vacation notice, this may indicate that the user will need to use the mobile computing system in a battery operated state. In some embodiments, adjacent calendar entries indicating that battery power may be necessary may be treated as a single calendar entry having a duration that is equal to the sum of the durations of each adjacent calendar entry for the purposes of battery management.

Based on the user's calendar in schedule application 214, the battery management driver 210 may provide information to the charge management module 208 about the time and duration of the next calendar period that indicates battery operation may be necessary. Based on the user's calendar in schedule application 214, the battery management driver 210 may also provide information to the charge management module 208 about the length of time AC power will be available before battery operation may be necessary.

In some embodiments, the charge management module 208 may charge or discharge the battery cells 204 based on information received from the schedule application 214 via the operating system 212 and battery management driver 210 and also based on information received from the battery management unit 206.

In some embodiments, all or some of the functions of the charge management module 208 may be performed by the battery management driver 210, and the charge management module may thus be wholly or partially integrated into the battery management driver 210.

Figure 3:
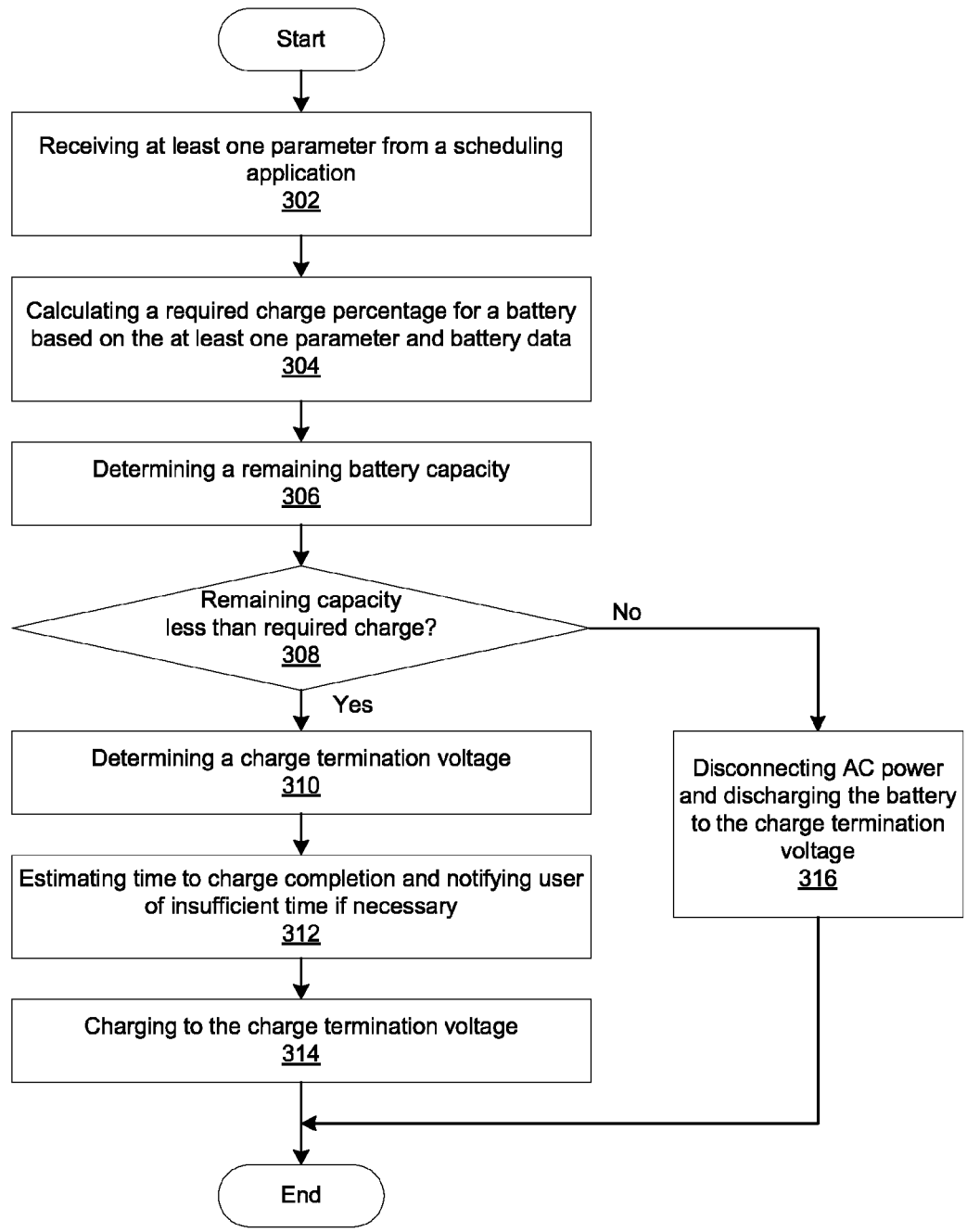
FIG. 3 is a flow diagram according to some embodiments.

FIG. 3 is a flow diagram illustrating a method according to some embodiments. The method may begin at block 302, with receiving at least one parameter from a scheduling application running on an operating system on a mobile computing device. The parameter(s) received from the scheduling application may include, for example, a length of time that a mobile computing device will be operating on battery power and/or a length of time that the mobile computing device will be connected to AC power before operating on battery power.

The method may continue at block 304, with calculating a required charge percentage for a battery based on the at least one parameter and battery pack data. In some embodiments, the battery pack data may be obtained from a battery management unit. At block 306, the actual remaining battery capacity may be determined.

If the remaining battery capacity is less than the required charge percentage, as shown in block 308, this is an indication that the battery must be charged. If the remaining battery capacity is greater than the required charge percentage, this is an indication that the battery must be discharged to reach the appropriate voltage. In this case, as shown in block 316, AC power may be disconnected from the mobile computing device such that the device operates on battery power. In this manner, the battery may be discharged to the charge termination voltage.

When the remaining battery capacity is less than the required charge percentage, a charge termination voltage may be determined, as shown in block 310. Based upon at least the remaining battery capacity and the charge termination voltage, a time to charge completion may be estimated, as shown in block 312. If the time to charge completion is greater than the length of time the mobile computing device will be connected to AC power before operating on battery power, the user of the mobile computing device may be notified that there is insufficient time to charge the battery, as shown in block 312. In some embodiments, the user may be notified of insufficient charge time via the scheduling application or may be notified in another manner. If the charge time is insufficient, the battery may be charged continuously until AC power is removed at the time indicated by the scheduling application.

After the charge termination voltage is determined, the mobile computing device may be switched from battery power to AC power, if AC power is not already being used, and the battery may be charged to the charge termination voltage, as indicated by block 314.

In some embodiments, the method illustrated in FIG. 3 may be performed by one or more of a charge management module, a battery management driver, or other hardware and/or software within a mobile computing device.

Various embodiments described herein may be implemented in one or any combination of hardware, firmware, and software. Some embodiments may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

Thus, battery charge management using a scheduling application is disclosed in various embodiments. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method comprising: receiving one or more parameters from a scheduling application running on a mobile computing device having a battery pack; calculating a required charge percentage for the battery pack based on at least the one or more parameters and battery pack data; determining a remaining capacity of the battery pack and a charge termination voltage; and charging the battery pack if the remaining capacity of the battery pack is less than the required charge percentage or discharging the battery pack if the remaining capacity of the battery pack is greater than the required charge percentage.

2. The method of claim 1, comprising:
    determining a remaining capacity of the battery pack.

3. The method of claim 2, wherein the one or more parameters comprise a length of time the mobile computing device will be operating on battery power or a length of time the mobile computing device will be connected to an AC power source before operating on battery power.

4. The method of claim 3, comprising:
    estimating a time to charge completion if the remaining capacity of the battery pack is less than the required charge percentage.

5. The method of claim 4, comprising:
generating a notification if the time to charge completion is greater than the length of time the mobile computing device will be connected to the AC power source before operating on battery power.

6. The method of claim 5, comprising:
generating the notification via the scheduling application.

7. The method of claim 1, wherein the battery pack data comprises one or more of temperature, cycle count, and current.

8. The method of claim 1, comprising:
disconnecting AC power and using battery power to power the mobile computing device to discharge the battery pack.

9. A system comprising: a processor to run a schedule application; a battery pack; and a charge management module coupled to the processor, and the battery pack, the charge management module operative to monitor battery pack data and one or more parameters from a scheduling application wherein the charge management module is to determine a length of time the battery pack is used based upon the schedule application, and to charge the battery pack if a remaining capacity of the battery pack is less than a required charge percentage calculated based on the battery pack data and the one or more parameters from the scheduling application or discharging the battery pack if the remaining capacity of the battery pack is greater than the required charge percentage, and if a length of time required to charge the battery pack to a desired voltage is greater than a time that AC power be available, the charge management module operative to generate a notification using schedule application or if a length of time required to charge management module operative to switch to AC power to charge the battery to the desired charge termination voltage.

10. The system of claim 9, wherein the charge management module is operative to determine a length of time the system will be coupled to an AC power source before the battery pack is used, determine a length of time the battery pack will be used based on the one or more parameters from the scheduling application, and to determine a time to charge completion.

11. The system of claim 10, wherein the charge management module is operative to to charge the battery pack if the time to charge completion is less than the length of time the system will be coupled to the AC power source before the battery pack is used.

12. The system of claim 11, wherein the charge management module is operative to switch from the AC power source to battery pack power when the battery pack reaches the charge termination voltage.

13. The system of claim 9, wherein the charge management module is operative to switch from the AC power source to battery pack power to discharge the battery pack if a remaining battery capacity is greater than the charge termination voltage.

14. The system of claim 9, wherein the battery pack data comprises one or more of temperature, cycle count, and current.

* * * * *

UNITED STATES PATENT AND TRADEMARK OFFICE
CERTIFICATE OF CORRECTION

PATENT NO. : 8,232,774 B2
APPLICATION NO. : 12/967209
DATED : July 31, 2012
INVENTOR(S) : Naoki Matsumura et al.

It is certified that error appears in the above-identified patent and that said Letters Patent is hereby corrected as shown below:

On the Title page, in field (74), in column 2, under "Attorney, Agent, or Firm", line 1, delete "Saisak" and insert -- Daisak --, therefor.

Title page, in the illustrative figure and on sheet 1 of 3, in Figure 1, in Box 110, line 1, delete "Managment" and insert -- Management --, therefor.

On sheet 2 of 3, in Figure 2, in Box 208, line 1, delete "Managment" and insert -- Management --, therefor.

In column 6, line 13, in claim 11, delete "to to" and insert -- to --, therefor.

Signed and Sealed this
Twenty-third Day of October, 2012

David J. Kappos
*Director of the United States Patent and Trademark Office*